No. 12,214. Reissued April 26, 1904.

UNITED STATES PATENT OFFICE.

ERNEST QUINTAINE, OF ARGENTEUIL, FRANCE.

PROCESS OF OBTAINING TIN BY ELECTROLYSIS.

SPECIFICATION forming part of Reissued Letters Patent No. 12,214, dated April 26, 1904.

Original No. 699,012, dated April 29, 1902. Application for reissue filed April 20, 1903. Serial No. 153,575.

*To all whom it may concern:*

Be it known that I, ERNEST QUINTAINE, chemist, a citizen of the French Republic, residing at 62 Grande Rue, Argenteuil, Department of Seine-et-Oise, France, have invented certain new and useful Improvements in Processes of Obtaining Tin by Electrolysis; and I do hereby declare the following to be a full, clear, and exact description of the invention, such as will enable others skilled in the art to which it appertains to make and use the same.

This invention relates to a process by which it is rendered possible to recover tin in a chemically-pure state from tin-scrap by electrolysis. All methods employed heretofore have given unsatisfactory results, because the salts of the tin have formed precipitations in the bath which prevented the electrolytic action, inasmuch as they offered too considerable resistance to the passage of the electric current.

The present process is adapted for all industrial branches where tin is treated, and the bath is perfectly clear, showing no precipitation and permitting the electric current to pass freely. To obtain this result, the precipitation in the bath caused by the salt employed is dissolved by the addition of a salt of ammonia.

I am aware that it is known to prepare a bath of chlorid of tin; but experience has shown that such bath is never clear, and on account of the resistance growing steadily the bath must be changed every few days. To obviate this inconvenience and carrying out my invention, I prepare a bath which consists of a solution of acid nitrate of tin, to which a certain quantity of a salt of ammonia (preferably sulfate of ammonia) is added in order to neutralize the bath.

For producing acid nitrate of tin I prepare a bath of a solution of acid nitrate of tin, to which is added gradually a certain amount of salt of ammonia and a tin chlorid. This gradual addition to the solution is continued until precipitation ceases. Thus the bath becomes limpid and clear as water, when it may be filtered and be ready for use.

For the purpose of obtaining the tin from tin-scrap the scrap is placed in a basket of wood or copper wire and is suspended in the bath as the anode. The action of the electric current passing from the anode through the bath dissolves the tin on the scrap, and the tin is dissolved and precipitated in a metallic and pure state and deposited on the cathode, the bath dissolving the tin only and acting in no injurious way on the iron or copper.

This electrolytic bath can be employed cold or hot, and the current employed should be weaker than the current necessary for the electrolytic treatment of copper; otherwise irregular decompositions might occur. When the electrolytic process is used for the precipitation of tin in order to remove the tin from tin-scrap, it is best to employ cathodes of lead upon which the tin will crystallize in the form of powder and fall to the bottom; but when the process is used for tinning objects the object to be tinned must be hung directly into the bath as the cathode, and in this case sheets of lead are employed as anodes. The tin will then cover the object with a clean metallic layer. The tension of the current is ordinarily 1.7 volts and should not be higher, for at a greater tension the current tends to decompose the bath. The strength of the current to be used varies between twenty and twenty-five amperes per square meter surface.

I claim as my invention—

1. The process of separating tin electrolytically from tin-scrap, which consists in suspending the scrap, as the anode, in a bath containing an aqueous solution of acid nitrate of tin to which have been added a salt of ammonia for neutralization, suspending a suitable cathode in the bath, and finally passing the electric current through the anode, bath and cathode, substantially as described.

2. The process of separating tin electrolytically from tin-scrap, as the anode, in a bath containing an aqueous solution of acid nitrate of tin to which have been added sulfate of ammonia for neutralization suspending a suitable cathode in a bath, and finally passing the electric current through the anode, bath and cathode, substantially as described.

3. The process of separating tin electrolytically from scrap-tin, which consists in suspending the scrap, as the anode, in a bath composed of an aqueous solution of acid nitrate of tin to which have been added a salt of ammonia and chlorid of tin, suspending a suitable cathode in the bath, and finally passing the electric current through the anode, bath and cathode, substantially as described.

In testimony whereof I affix my signature in presence of two witnesses.

ERNEST QUINTAINE.

Witnesses:
G. NAUHARDT,
AUGUSTUS E. INGRAM.